(12) United States Patent
DiFalco

(10) Patent No.: US 9,209,996 B2
(45) Date of Patent: Dec. 8, 2015

(54) DATA PROCESSING ENVIRONMENT CHANGE MANAGEMENT METHODS AND APPARATUSES

(75) Inventor: Robert A. DiFalco, Portland, OR (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 13/424,152

(22) Filed: Mar. 19, 2012

(65) Prior Publication Data

US 2012/0179805 A1 Jul. 12, 2012

Related U.S. Application Data

(62) Division of application No. 11/097,681, filed on Mar. 31, 2005, now Pat. No. 8,140,635.

(51) Int. Cl.
| | |
|---|---|
| *G06F 15/173* | (2006.01) |
| *H04L 12/66* | (2006.01) |
| *G06F 9/445* | (2006.01) |
| *H04L 12/24* | (2006.01) |
| *G06F 9/44* | (2006.01) |

(52) U.S. Cl.
CPC ........ *H04L 12/66* (2013.01); *G06F 8/60* (2013.01); *G06F 8/70* (2013.01); *H04L 41/082* (2013.01)

(58) Field of Classification Search
CPC ............ H04L 41/082; G06F 8/60; G06F 8/70
USPC ............... 707/203, 600, 999.103, 100, 104.1; 717/174, 122, 168; 709/220, 223, 238; 370/254; 713/165
See application file for complete search history.

(56) References Cited

U.S. PATENT DOCUMENTS

| | | | |
|---|---|---|---|
| 5,063,523 A | | 11/1991 | Vrenjak |
| 5,410,703 A | * | 4/1995 | Nilsson et al. ............... 717/168 |
| 5,542,047 A | | 7/1996 | Armstrong |
| 5,655,081 A | | 8/1997 | Bonnell et al. |
| 5,745,669 A | | 4/1998 | Hugard et al. |
| 5,764,913 A | | 6/1998 | Jancke et al. |
| 5,778,184 A | | 7/1998 | Brownmiller et al. |
| 5,845,062 A | | 12/1998 | Branton et al. |
| 5,878,408 A | | 3/1999 | Van Huben et al. |
| 5,913,036 A | | 6/1999 | Brownmiller et al. |
| 5,913,037 A | | 6/1999 | Spofford et al. |
| 5,933,838 A | | 8/1999 | Lomet |
| 5,963,959 A | | 10/1999 | Sun et al. |
| 6,041,347 A | | 3/2000 | Harsham et al. |
| 6,052,722 A | | 4/2000 | Taghadoss |
| 6,064,656 A | | 5/2000 | Angal et al. |
| 6,072,777 A | | 6/2000 | Bencheck et al. |
| 6,122,639 A | * | 9/2000 | Babu et al. ............. 707/999.103 |
| 6,122,664 A | | 9/2000 | Boukobza et al. |
| 6,125,390 A | | 9/2000 | Touboul |
| 6,144,993 A | | 11/2000 | Fukunaga et al. |
| 6,151,643 A | * | 11/2000 | Cheng et al. ................... 710/36 |
| 6,195,689 B1 | | 2/2001 | Bahlmann |

(Continued)

OTHER PUBLICATIONS

Derbort et al., "Conversion of a Rule Based to an Object Oriented Expert System," *IEEE*, pp. 751-754 (1991).

(Continued)

*Primary Examiner* — Dustin Nguyen
(74) *Attorney, Agent, or Firm* — Klarquist Sparkman, LLP

(57) ABSTRACT

An apparatus is provided with a change management module adapted to manage making changes to a data processing device of a data processing environment.

15 Claims, 5 Drawing Sheets

(56) References Cited

U.S. PATENT DOCUMENTS

| | | | |
|---|---|---|---|
| 6,222,827 B1 | 4/2001 | Grant et al. | |
| 6,253,339 B1 | 6/2001 | Tse et al. | |
| 6,272,537 B1 | 8/2001 | Kekic et al. | |
| 6,341,287 B1 | 1/2002 | Sziklai et al. | |
| 6,356,885 B2 | 3/2002 | Ross et al. | |
| 6,393,386 B1 | 5/2002 | Zager et al. | |
| 6,393,474 B1 | 5/2002 | Eichert et al. | |
| 6,493,755 B1 | 12/2002 | Hansen et al. | |
| 6,535,512 B1 | 3/2003 | Daniel et al. | |
| 6,658,568 B1 | 12/2003 | Ginter et al. | |
| 6,664,978 B1 | 12/2003 | Kekic et al. | |
| 6,701,345 B1 | 3/2004 | Carley et al. | |
| 6,742,114 B1 | 5/2004 | Carter et al. | |
| 6,751,661 B1 | 6/2004 | Geddes | |
| 6,853,987 B1 | 2/2005 | Cook | |
| 6,886,047 B2 | 4/2005 | Leong et al. | |
| 6,895,414 B2 | 5/2005 | Ford et al. | |
| 6,938,081 B1* | 8/2005 | Mir | 709/223 |
| 6,957,227 B2 | 10/2005 | Fogel et al. | |
| 6,983,317 B1 | 1/2006 | Bishop et al. | |
| 6,996,601 B1* | 2/2006 | Smith | 709/203 |
| 7,016,888 B2 | 3/2006 | Slemmer et al. | |
| 7,035,877 B2 | 4/2006 | Markham et al. | |
| 7,039,698 B2 | 5/2006 | Slemmer et al. | |
| 7,051,050 B2 | 5/2006 | Chen et al. | |
| 7,058,861 B1 | 6/2006 | Adams | |
| 7,065,767 B2 | 6/2006 | Kambhammettu et al. | |
| 7,080,037 B2 | 7/2006 | Burger et al. | |
| 7,082,554 B2 | 7/2006 | Wilson et al. | |
| 7,158,985 B1 | 1/2007 | Liskov | |
| 7,159,036 B2 | 1/2007 | Hinchliffe et al. | |
| 7,228,460 B2 | 6/2007 | Pomaranski et al. | |
| 7,243,348 B2 | 7/2007 | Good et al. | |
| 7,290,164 B1 | 10/2007 | Harvey et al. | |
| 7,316,016 B2 | 1/2008 | DiFalco | |
| 7,317,693 B1 | 1/2008 | Roesch et al. | |
| 7,360,099 B2 | 4/2008 | DiFalco et al. | |
| 7,437,712 B1* | 10/2008 | Brown et al. | 717/122 |
| 7,474,425 B2 | 1/2009 | Sasama | |
| 7,529,197 B2* | 5/2009 | Shell et al. | 370/254 |
| 7,587,754 B2 | 9/2009 | DiFalco et al. | |
| 7,590,669 B2* | 9/2009 | Yip et al. | 1/1 |
| 7,603,440 B1* | 10/2009 | Grabowski et al. | 709/220 |
| 7,620,715 B2 | 11/2009 | DiFalco et al. | |
| 7,636,736 B1 | 12/2009 | Kumar et al. | |
| 7,765,460 B2 | 7/2010 | DiFalco et al. | |
| 7,822,724 B2 | 10/2010 | DiFalco et al. | |
| 8,090,677 B2* | 1/2012 | Murphy et al. | 707/600 |
| 8,140,635 B2 | 3/2012 | DiFalco | |
| 8,176,158 B2 | 5/2012 | DiFalco et al. | |
| 8,914,341 B2 | 12/2014 | DiFalco | |
| 2001/0044840 A1 | 11/2001 | Carleton | |
| 2001/0052010 A1 | 12/2001 | Kim | |
| 2002/0026339 A1 | 2/2002 | Frankland et al. | |
| 2002/0035561 A1 | 3/2002 | Archer et al. | |
| 2002/0069274 A1* | 6/2002 | Tindal et al. | 709/223 |
| 2002/0116363 A1 | 8/2002 | Grainger | |
| 2002/0176378 A1 | 11/2002 | Hamilton et al. | |
| 2002/0188711 A1 | 12/2002 | Meyer et al. | |
| 2003/0005109 A1 | 1/2003 | Kambhammettu et al. | |
| 2003/0008662 A1 | 1/2003 | Stern et al. | |
| 2003/0101341 A1 | 5/2003 | Kettler et al. | |
| 2003/0110280 A1 | 6/2003 | Hinchliffe et al. | |
| 2003/0149756 A1* | 8/2003 | Grieve et al. | 709/223 |
| 2003/0172151 A1 | 9/2003 | Schade | |
| 2003/0197743 A1 | 10/2003 | Hill et al. | |
| 2003/0202201 A1 | 10/2003 | Muto et al. | |
| 2003/0204517 A1 | 10/2003 | Skinner et al. | |
| 2003/0217134 A1 | 11/2003 | Fontoura et al. | |
| 2003/0233431 A1 | 12/2003 | Reddy et al. | |
| 2004/0006614 A1 | 1/2004 | DiFalco | |
| 2004/0024843 A1 | 2/2004 | Smith | |
| 2004/0059770 A1 | 3/2004 | Bossen | |
| 2004/0059930 A1 | 3/2004 | DiFalco et al. | |
| 2004/0060046 A1* | 3/2004 | Good et al. | 717/174 |
| 2004/0068562 A1 | 4/2004 | Tilton et al. | |
| 2004/0122962 A1 | 6/2004 | DiFalco et al. | |
| 2004/0123133 A1 | 6/2004 | DiFalco et al. | |
| 2004/0153875 A1 | 8/2004 | Amyot et al. | |
| 2004/0186903 A1 | 9/2004 | Lambertz | |
| 2004/0187103 A1* | 9/2004 | Wickham et al. | 717/168 |
| 2004/0205182 A1 | 10/2004 | Geddes | |
| 2004/0243600 A1 | 12/2004 | Ikeda et al. | |
| 2004/0252693 A1 | 12/2004 | Cheriton et al. | |
| 2004/0254927 A1 | 12/2004 | Lang et al. | |
| 2004/0260803 A1 | 12/2004 | Nakamura | |
| 2005/0005169 A1 | 1/2005 | Kelekar | |
| 2005/0015622 A1 | 1/2005 | Williams et al. | |
| 2005/0043961 A1 | 2/2005 | Torres et al. | |
| 2005/0080801 A1* | 4/2005 | Kothandaraman et al. | 707/100 |
| 2005/0096949 A1 | 5/2005 | Aiber et al. | |
| 2005/0097199 A1 | 5/2005 | Woodard et al. | |
| 2005/0120101 A1 | 6/2005 | Nocera | |
| 2005/0149578 A1 | 7/2005 | Sustman et al. | |
| 2005/0165954 A1* | 7/2005 | Burdick et al. | 709/238 |
| 2005/0177600 A1 | 8/2005 | Eilam et al. | |
| 2005/0207553 A1 | 9/2005 | Fleck et al. | |
| 2005/0256787 A1 | 11/2005 | Wadawadigi et al. | |
| 2005/0278191 A1 | 12/2005 | DiFalco et al. | |
| 2006/0025985 A1 | 2/2006 | Vinberg et al. | |
| 2006/0031529 A1 | 2/2006 | Keith, Jr. | |
| 2006/0036560 A1 | 2/2006 | Fogel | |
| 2006/0080656 A1* | 4/2006 | Cain et al. | 717/174 |
| 2006/0143685 A1 | 6/2006 | Vasishth et al. | |
| 2006/0149704 A1 | 7/2006 | Wyatt et al. | |
| 2006/0184792 A1* | 8/2006 | Berlin | 713/165 |
| 2006/0195905 A1 | 8/2006 | Fudge | |
| 2006/0212477 A1* | 9/2006 | Murphy et al. | 707/104.1 |
| 2006/0224663 A1 | 10/2006 | DiFalco | |
| 2006/0242277 A1 | 10/2006 | Torrence et al. | |
| 2007/0005320 A1 | 1/2007 | Vinberg et al. | |
| 2007/0005740 A1 | 1/2007 | DiFalco et al. | |
| 2007/0022365 A1 | 1/2007 | DiFalco et al. | |
| 2007/0028303 A1 | 2/2007 | Brennan | |
| 2007/0043674 A1 | 2/2007 | DiFalco et al. | |
| 2007/0043786 A1 | 2/2007 | DiFalco et al. | |
| 2007/0124255 A1 | 5/2007 | DiFalco et al. | |
| 2008/0104217 A1 | 5/2008 | Srinivasa et al. | |
| 2008/0126377 A1 | 5/2008 | Bush et al. | |
| 2008/0229262 A1 | 9/2008 | Harashima et al. | |
| 2009/0171732 A1 | 7/2009 | Bobak et al. | |
| 2009/0183236 A1 | 7/2009 | Ben-Ezra et al. | |
| 2009/0204701 A1 | 8/2009 | Herzog et al. | |
| 2010/0005107 A1 | 1/2010 | DiFalco | |
| 2011/0137905 A1 | 6/2011 | Good et al. | |
| 2011/0138038 A1 | 6/2011 | Good et al. | |
| 2011/0138039 A1 | 6/2011 | Good et al. | |
| 2011/0197094 A1 | 8/2011 | Wagner | |
| 2011/0197189 A1 | 8/2011 | Wagner et al. | |
| 2011/0197205 A1 | 8/2011 | Wagner et al. | |
| 2012/0023076 A1 | 1/2012 | Torrence et al. | |

OTHER PUBLICATIONS

Kerschberg et al., "Intelligent Network Management: A Heterogeneous Knowledge Source Approach," *IEEE*, pp. 314-316 (1990).

Parnas, "On the Criteria to Be Used in Decomposing Systems into Modules," Communications of the ACM, vol. 15, No. 12, pp. 1053-1058 (Dec. 1972).

* cited by examiner

DATA PROCESSING ENVIRONMENT CHANGE MANAGEMENT METHODS AND APPARATUSES

This application is a divisional of U.S. patent application Ser. No. 11/097,681, entitled "DATA PROCESSING ENVIRONMENT CHANGE MANAGEMENT METHODS AND APPARATUSES" filed Mar. 31, 2005 and issued on Mar. 20, 2012 as U.S. Pat. No. 8,140,635, which is hereby incorporated by reference.

TECHNICAL FIELD

The present invention relates generally to the fields of data processing, and managing changes to data processing devices of a data processing environment.

BACKGROUND

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring special conditioned environment to operate. At the same time, special purpose computing devices such as personal digital assistants, media players, wireless mobile phones are becoming common. Further, advances in networking, telecommunication, satellite, and other related technologies have also led to increase in connectivity between computing devices, making possible networked computing over private and/or public networks, such as the Internet.

However, as networked computing continues to grow in sophistication, enterprise networks become increasingly complex. From configuration, application service provision, change management, to network protection, enterprises currently face many challenges.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to methods for managing changes in a data processing environment, and hardware/software endowed to practice and/or support the practice of the methods in whole or in part.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
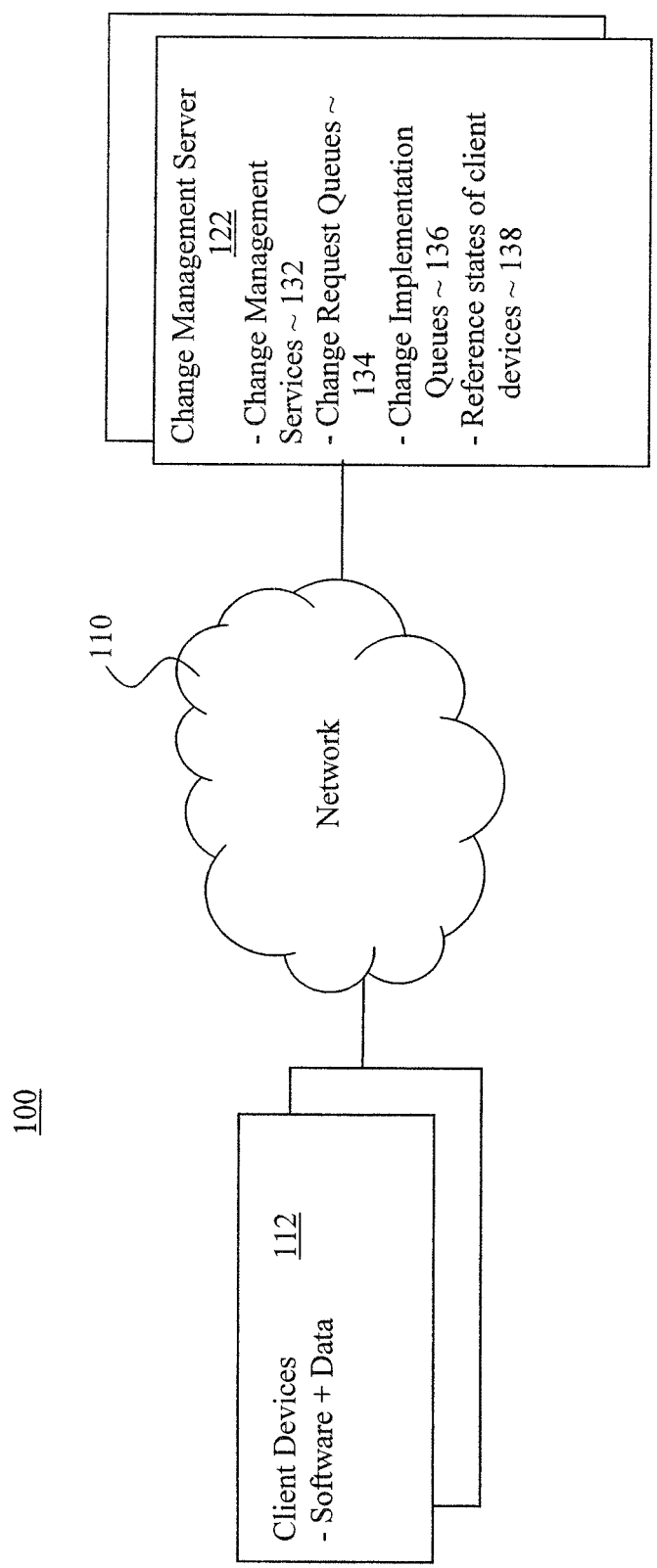
FIG. 1 illustrates a data processing environment practicing the present invention, in accordance with various embodiments.

Referring now to FIG. 1, wherein an overview of a data processing environment practicing the present invention, in accordance with various embodiments, is shown. As illustrated, data processing environment 100 includes a number of Client Devices 112 coupled to each other and one or more Change Management Servers 122 via network 110. For the embodiments, Change Management Servers 122 are endowed with Change Management Service 132, equipped to manage changes to Client Devices 112. In various embodiments, data processing environment 100 is an Enterprise Computing Environment.

Client Devices 112 are so referred as they are Clients of Change Management Servers 122, as changes to Client Devices 112 are managed at least in part by Change Management Services 132 of Change Management Servers 122. Client Devices 112 may have a peer-to-peer or client-server relationship to each other. Accordingly, they may be any one of a number of electronic and/or computing devices, having hardware, software and/or data. Examples of such devices include but are not limited to servers, desktop computers, laptop computers, tablet computers, palm-sized computing devices, personal digital assistants, media players, cellular phones, set-top boxes, networking devices, and so forth.

In various embodiments, Change Management Servers 122 comprise a cluster of interconnected servers, directly, over a local area network, and/or over a wide area network. In other embodiments, Change Management Servers 122 comprise a single server having one or more processors.

In various embodiments, Change Management Service 132 includes a number of Change Request Queues 134, Change Implementation Queues 136, and Reference States 138 of Client Devices 112. In various embodiments, Change Request Queues 134 are employed to store and hold Change Requests, until they are approved for implementation, whereas Change Implementation Queues 136 are employed to store and hold approved Change Requests, pending implementation. Reference States of Client Devices 138 comprise memorializations or images of the last known good states of Client Devices 112.

In various embodiments, the Change Requests may include identification information identifying the hardware, software and/or data elements to be changed, and/or the changes to be performed. In various embodiments, the Change Requests may further include dependency of the desired changes.

These and are aspects of Change Management Service 132 will be further described below, after an exemplary Change Management Process is first described, referencing FIG. 2.

Figure 2:
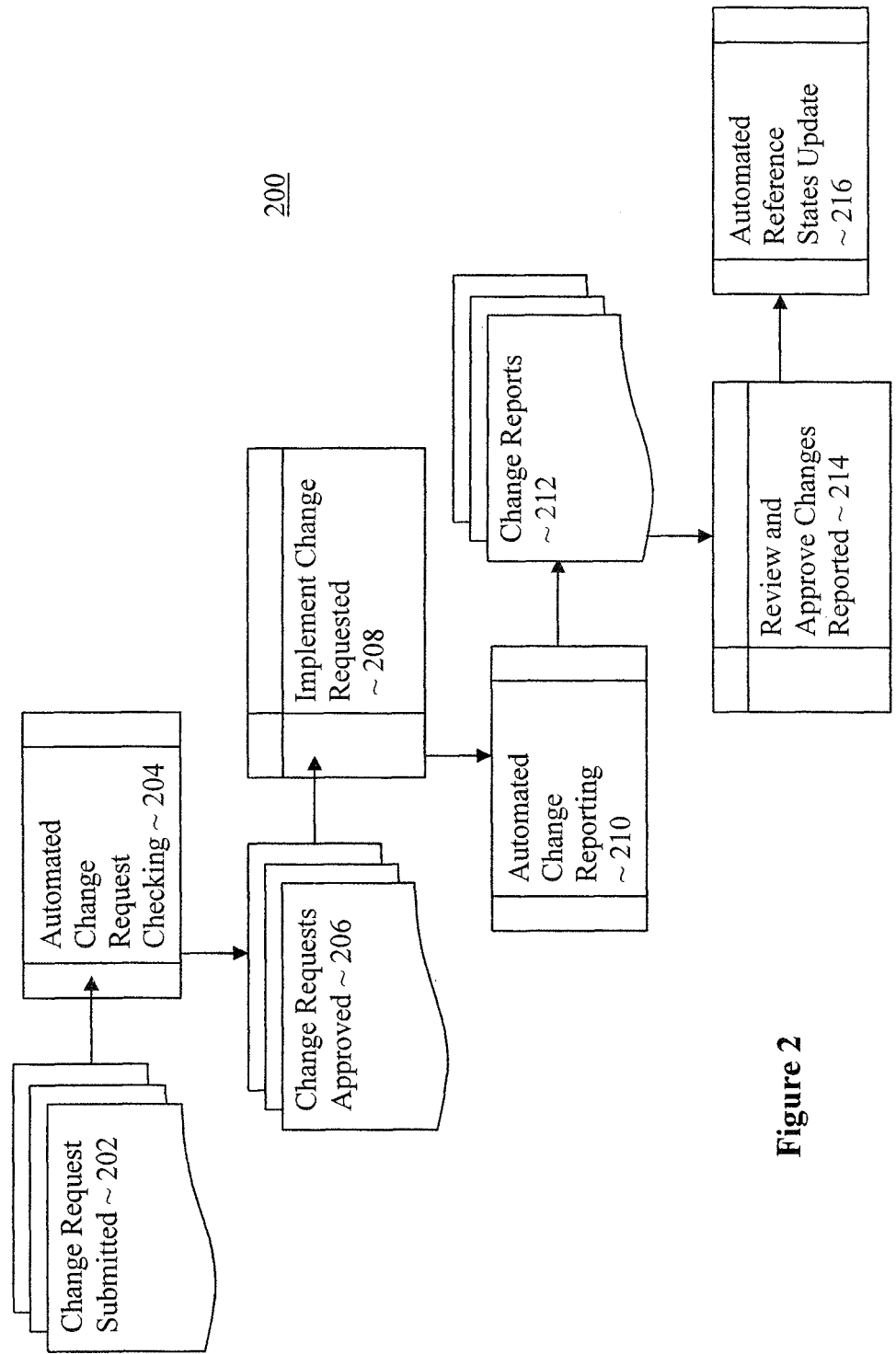
FIG. 2 illustrates an exemplary change management process of the data processing environment, in accordance with various embodiments.

As alluded to earlier, FIG. 2 illustrates an exemplary Change Management Process that may be practiced to manage changes to Client Devices of a data processing environment, in accordance with various embodiments. As illustrated, Change Requests 202 for requesting changes to hardware, software and/or data of various Client Devices 112 may be submitted, e.g. by various end users and/or IT administrators of data processing environment 100. In various embodiments, Change Requests 202, having identification information identifying the elements to be changed, the changes to be applied, and/or dependency of the changes, may be stored in Change Request Queues 134 as earlier described.

Further, as illustrated, automated checks 204 on the queued pending Change Requests may be performed periodically (or continuously) to approve or reject the requested changes. In various embodiments, Change Management Service 132 checks the previously approved Change Requests in Change Request Implementation Queues 136 to determine whether all dependencies of each queued Change Request have been implemented. That is, there is no change implementation pending for any identified change dependency of the Change Request.

For the illustrated embodiments, Change Management Services 132 rejects all Change Requests having dependency on pending change implementations. Change Management Services 132 approves only Change Requests with no dependency on pending change implementations. In various embodiments, approved Change Requests are moved from the Change Requests Queues 134 to Change Request Implementation Queues 136 for implementation scheduling and/or assignment to implementers.

In due course, the approved Change Requests are implemented by the assigned implementer(s) at or about the scheduled time, 208. In various embodiments, on notification of implementation of a Change Request, an automated change reporting 210 is performed by Change Management Service 132, resulting in Change Reports 212.

In various embodiments, Change Management Service 132 generates a Change Report 212 by comparing the current state of the Client Device 112 with its previously saved Reference State. In various embodiments, Change Report 212 includes a number of Change Records describing the various changes to the hardware, software and/or data elements of the Client Device 112.

In various embodiments, Change Reports 212 may be subjected to a review and approval process, 214. In various embodiments, the review and approval process may be performed manually, or automated, in full or in part.

For the embodiments, on approval of the changes enumerated in a Change Report 212 for a client device 112, Change Management Service 132 automatically generates and saves 216 a new Reference State for the Client Device 112.

Figure 3:
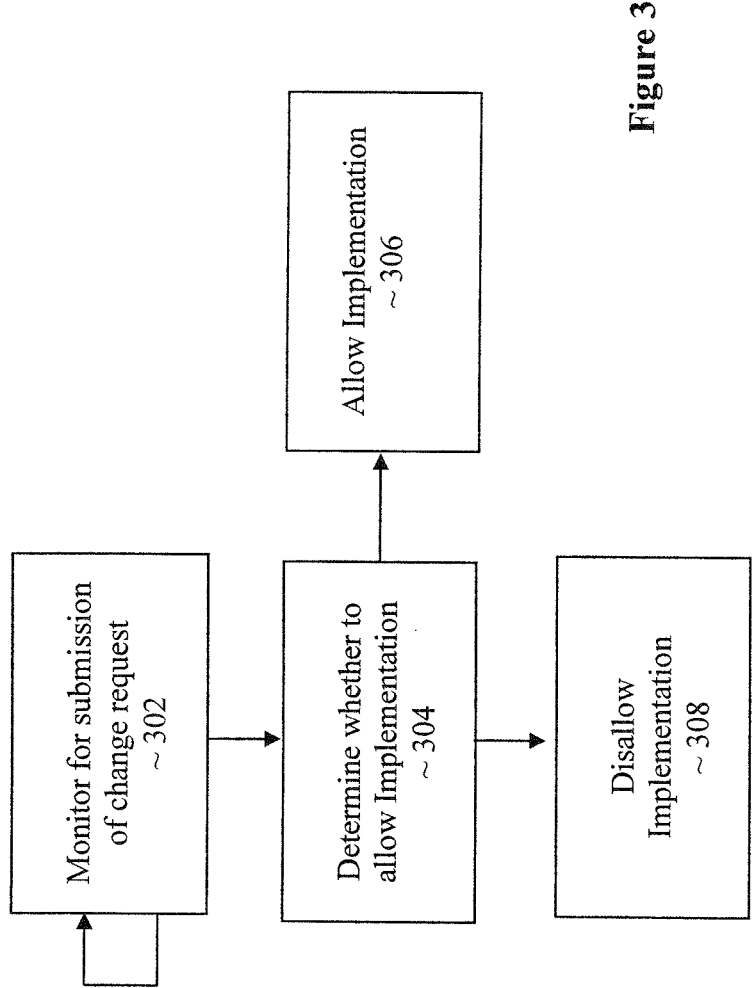
FIGS. 3-5 illustrate flow chart views of selected operations of the Change Management Services of FIG. 1, in accordance with various embodiments.

FIG. 3 illustrates a flow chart view of selected operations of Change Management Service 132, in accordance with various embodiments. As illustrated, for the embodiments, Change Management Service 132 monitors for Change Requests submitted, block 302. On detection of the submission of a Change Request, Change Management Service 132 determines whether the Change Request may be approved for implementation, block 304.

For the embodiments, if a Change Request is to be allowed, Change Management Service 132 approves and moves the Change Request from the Change Request Queue 134 to the Change Request Implementation Queue 136 accordingly, block 306. However, if a Change Request is to be disallowed, Change Management Service 132 rejects the Change Request accordingly, block 308.

In various embodiments, rejections may be effectuated by removing the rejected Change Requests from the Change Request Queue 134, and returning them to the requestor.

Figure 4:
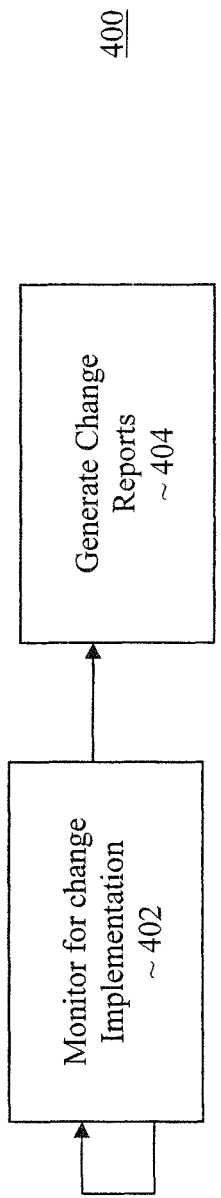

FIG. 4 illustrates a flow chart view of further selected operations of Change Management Service 132, in accordance with various embodiments. As illustrated, for the embodiments, Change Management Service 132 further monitors for completion of Change Implementations, block 402. On detection of the completion of a Change Implementation, Change Management Service 132 automatically generates a Change Report for the Client Device 112, block 404.

Figure 5:
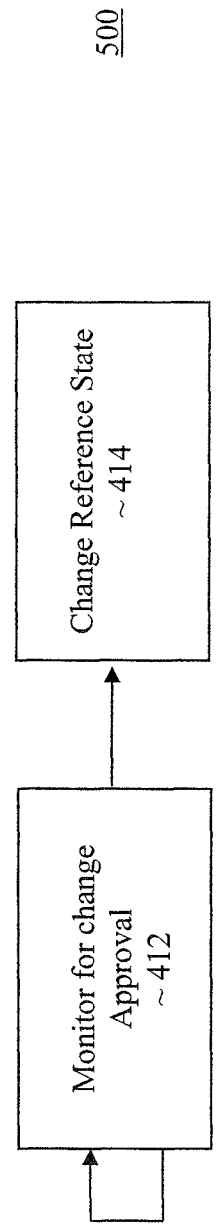

FIG. 5 illustrates a flow chart view of further selected operations of Change Management Service 132, in accordance with various embodiments. As illustrated, for the embodiments, Change Management Service 132 further monitors for approval of changes reported, block 412. On detection of approval of reported changes for a Client Device 112, Change Management Service 132 generates a new Reference State for the Client Device 112, block 414.

Figure 6:
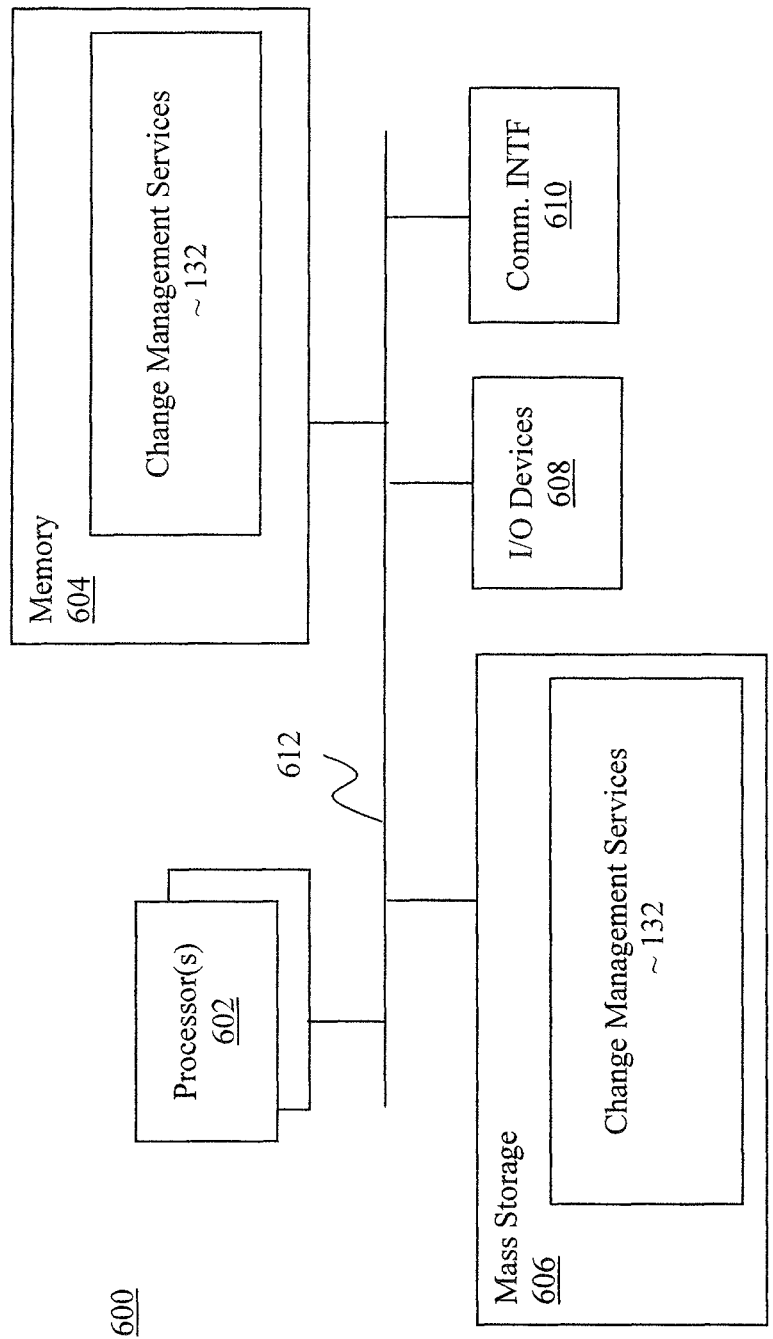
FIG. 6 illustrates an architectural view of a Change Management Server of FIG. 1 in further detail, in accordance with various embodiments.

FIG. 6 illustrates an example implementation of one of servers 122 of FIG. 1, in accordance with various embodiments. As illustrated, a server 122 includes digital computing processor 602, memory 604 coupled to each other via bus 612. Further, server 122 includes mass storage device 606, a number of I/O devices 608 and communication interface 610, and coupled to each other and the earlier described elements as shown. Memory 604 and mass storage device 606 include in particular, a transient and a persistent copy of instructions implementing Change Management Services 132 respectively.

In various embodiments, processor 602 may be any one of a number of microprocessors known in the art, or to be designed (as long as they are consistent with the teachings of the present invention), including but are not limited to, the processors available from Intel Corp., of Santa Clara, Calif.

Memory 604 may likewise be any one of a number of volatile storage known in the art or to be designed (as long as they are consistent with the teachings of the present invention), including but are not limited to, the volatile storage available from Kingston Technology of Fountain Valley, Calif.

Mass storage device 606 may likewise be any one of a number of non-volatile storage known in the art or to be designed (as long as they are consistent with the teachings of the present invention), including but are not limited to, the non-volatile disk storage available from Seagate of City, Calif.

I/O devices 608 may include a display, a keyboard and/or a cursor control device.

In various embodiments, communication interfaces 610 include a communication interface for coupling server 122 to Client Devices 112. The communication interface may be a wire based or wireless interface, coupling server 122 to devices 112 via a wired/wireless local/wide area network. An example of a suitable wired network interface includes but is not limited to an Ethernet interface, and an example of a suitable wireless network interface includes but is not limited to an IEEE 802.11b network interface.

Except for the instructions implementing Change Management Software 132 (earlier described), and the manner these elements are employed, each of these elements represents a broad range of the corresponding element known in the art or to be designed, consistent with the teachings of the present invention. The elements perform their conventional functions, i.e. processing, storage, reading, displaying, and so forth.

In alternate embodiments, all or portions of Change Management Software 132 may be implemented in hardware, e.g. using Application Specification Integrated Circuits (ASIC).

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

The invention claimed is:

1. An automated method for facilitating management of a data processing environment comprising:
   receiving a change request for making a change to a data processing device of the data processing environment;
   upon determining, as a result of a pre-implementation change request approval process, that the received change request has been approved, selecting the change for implementation;
   after receiving an indication that the change has been made, generating a change report, in digital form, based at least in part on a reference state of the data processing device, the change report enumerating the change made to the data processing device;
   receiving an indication of a post-implementation change approval of the enumerated change; and
   in response to receiving the indication of post-implementation change approval of the enumerated changes, updating the reference state of the data processing device to include the enumerated changes.

2. The method of claim 1, wherein the reference state is a previously saved known good state of the data processing device, and said generating comprises comparing a current state of the data processing device with the previously saved known good state of the data processing device.

3. The method of claim 1, wherein the reference state is a previously saved known good state of the data processing device, and said updating comprises saving a current state of the data processing device as a new reference state of the data processing device replacing the previously saved known good state of the data processing device.

4. The method of claim 1, wherein the data processing device is a selected one of a server, a client computing device, or a networking device.

5. An apparatus, comprising:
   a processor; and
   a change management module adapted to be operated by the processor to enable the apparatus to:
      receive a change request for making a change to a data processing device of a data processing environment,
      upon determining, as a result of a pre-implementation change request approval process, that the received change request has been approved, select the change for implementation,
      after receiving an indication that the change has been made, generate a change report enumerating the change made to the data processing device based at least in part on a reference state of the data processing device,
      receive an indication of a post-implementation change approval of the enumerated change, and
      in response to receiving the indication of the post-implementation change approval of the enumerated change, update the reference state of the data processing device to include the enumerated changes.

6. The apparatus of claim 5, wherein the reference state is a previously saved known good state of the data processing device, and said change management module is further adapted to compare a current state of the data processing device with the previously saved known good state of the data processing device.

7. The apparatus of claim 5, wherein the reference state is a previously saved known good state of the data processing device, and said change management module is further adapted to save a current state of the data processing device as a new reference state of the data processing device replacing the previously saved known good state of the data processing device.

8. The apparatus of claim 5, wherein the apparatus is a selected one of a server of the data processing device, or a peer computing device of the data processing device.

9. A computer-readable memory device or storage device storing computer-executable instructions which when executed by a computer cause the computer to perform a method, the method comprising:
   receiving a change request for making a change to a data processing device of the data processing environment;
   upon determining, as a result of a pre-implementation change request approval process, that the received change request has been approved, selecting the change for implementation;
   after receiving an indication that the change has been made, generating a change report, in digital form, based at least in part on a reference state of the data processing device, the change report enumerating the change made to the data processing device;
   receiving an indication of a post-implementation change approval of the enumerated change; and
   in response to receiving the indication of post-implementation change approval of the enumerated changes, updating the reference state of the data processing device to include the enumerated changes.

10. The computer-readable memory device or storage device of claim 9, wherein the reference state is a previously saved known good state of the data processing device, and said generating comprises comparing a current state of the data processing device with the previously saved known good state of the data processing device.

11. The computer-readable memory device or storage device of claim 9, wherein the reference state is a previously saved known good state of the data processing device, and said updating comprises saving a current state of the data processing device as a new reference state of the data processing device replacing the previously saved known good state of the data processing device.

12. The computer-readable memory device or storage device of claim 9, wherein the data processing device is a selected one of a server, a client computing device, or a networking device.

13. The method of claim 1, wherein the pre-implementation change request approval process comprises determining whether the change request has a dependency on another change for which implementation is pending.

14. The apparatus of claim 5, wherein the pre-implementation change request approval process comprises determining whether the change request has a dependency on another change for which implementation is pending.

15. The computer-readable memory device or storage device of claim 9, wherein the pre-implementation change request approval process comprises determining whether the change request has a dependency on another change for which implementation is pending.

\* \* \* \* \*